US 6,597,133 B2

(12) United States Patent
Hudson

(10) Patent No.: US 6,597,133 B2
(45) Date of Patent: Jul. 22, 2003

(54) TWO-WIRE LIGHTING CONTROL SYSTEM WITH INDICATOR FOR IMMINENT TIME OUT PERIOD EXPIRATION

(75) Inventor: Christopher A. Hudson, Blacksburg, VA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/942,964

(22) Filed: Aug. 31, 2001

(65) Prior Publication Data
US 2003/0057880 A1 Mar. 27, 2003

(51) Int. Cl.[7] .............................................. H05B 37/02
(52) U.S. Cl. ...................................... 315/360; 315/362
(58) Field of Search ................................ 315/360, 362, 315/292, 293

(56) References Cited

U.S. PATENT DOCUMENTS

| 3,925,704 A | 12/1975 | Camic .................... 315/200 A |
| 4,013,922 A | 3/1977 | Van Der Meulen ......... 315/362 |
| 4,338,562 A | 7/1982 | Terwilliger ................. 323/323 |
| 4,349,748 A | 9/1982 | Goldstein et al. ........... 307/132 |
| 4,508,997 A | 4/1985 | Woodnutt ................... 315/360 |
| 4,593,234 A | 6/1986 | Yang ........................... 315/362 |
| 4,713,598 A | 12/1987 | Smith ......................... 323/245 |
| 5,216,333 A | 6/1993 | Nuckolls et al. ............ 315/291 |
| 5,357,170 A | 10/1994 | Luchaco et al. ............ 315/159 |
| 5,442,261 A | 8/1995 | Bank et al. .................. 315/307 |
| 5,451,843 A | 9/1995 | Kahn et al. ................. 315/186 |
| 5,469,346 A | 11/1995 | Haut et al. .................. 362/205 |
| 5,815,086 A | 9/1998 | Ivie et al. ............. 340/825.52 |
| 5,990,635 A | 11/1999 | Ference et al. ............. 315/362 |
| 6,114,816 A | 9/2000 | Nuckolls et al. ............ 315/324 |
| 6,151,529 A | 11/2000 | Batko .......................... 700/28 |

Primary Examiner—David Vu
(74) Attorney, Agent, or Firm—Stacey J. Longanecker; Peter L. Kendall; Alfred N. Goodman

(57) ABSTRACT

An apparatus and method for controlling a plurality of lighting fixtures. A start controller provides power to the plurality of lighting fixtures. A control power timer connected to the start controller provides a first time period for illumination of the plurality of lighting fixtures, wherein the start controller is operable to interrupt power to the plurality of lighting fixtures when the first time period expires. A control timer connected to the control power timer provides a second time period for illumination of the plurality of lighting fixtures, wherein the second time period commences and then elapses before the end of the first time period. A control flasher connected to the control timer alternates the plurality of lighting fixtures between a high power state and a low power state during the second time period for illumination. An end user is alerted to the termination of the illumination of the plurality of lighting fixtures before termination occurs.

31 Claims, 5 Drawing Sheets

US 6,597,133 B2

TWO-WIRE LIGHTING CONTROL SYSTEM WITH INDICATOR FOR IMMINENT TIME OUT PERIOD EXPIRATION

FIELD OF THE INVENTION

The invention relates to a method and apparatus for controlling lighting fixtures and, more particularly, to a method and apparatus for alerting occupants in a lighted area that the timing cycle of the lighting fixtures is due to expire.

BACKGROUND OF THE INVENTION

Many recreational facilities require a significant number of lighting fixtures for adequate illumination and, therefore, use a significant amount of power to operate the fixtures. To reduce power consumed to light these facilities, a number of facilities use lighting control systems which control when the lighting fixtures are energized. For example, a step-dimming system, such as the two-level lighting control system disclosed in U.S. Pat. No. 5,216,333 to Nuckolls, can be used to switch facility fixtures between energy saving, low-level or reduced wattage operation, and full-level or normal wattage operation in accordance with output signals from a motion sensor. Step-dimming systems can respond to other conditions besides occupancy levels such as ambient light level, time and manual switching. U.S. Pat. No. 4,713,598 to Smith discloses another device for controllably switching an AC line to energize a load. The device uses a passive infrared (PIR) detector to sense motion.

However, PIR sensors do not work well in outdoor conditions. Temperature and sun light can affect the sensing ability of these types of sensors. Additionally, timing devices can be used; however, it can be difficult to set a suitable time out (TO) period. For example, it is difficult to anticipate the amount of time period an occupant needs a facility and preprogram a corresponding time out period. This problem is particularly apparent with respect to recreational facilities because the time a user requires a recreational facility can vary depending on the users, and the game or event.

Another problem with existing lighting control devices is that the end user does not know when illumination of lighting fixtures, which are subject to time out operation, will end. For instance, if an end user reserves a facility for two hours and does not monitor the amount of time that has elapsed, the illumination of the facility may terminate unexpectedly, creating sufficient darkness in the facility to make it difficult for the end user to find the lighting control and reset the timer.

Another problem with existing lighting control devices is that they only interface with a low voltage two-wire lighting fixture. There presently is no lighting control device that interfaces with a high voltage two-wire lighting fixture.

Therefore, a lighting control system is needed to provide time out periods that can be used outdoors, as well as indoors, that is not subject to temperature or extraneous lighting conditions, that can be reset by an end user before a facility goes dark and that is easy to operate by the end user. It would also be useful to have a lighting control system that can interface with fixtures in either of an industrial or commercial power system (e.g. 480 VAC) and a residential power system (e.g., 120 VAC).

SUMMARY OF THE INVENTION

An apparatus and method for controlling a plurality of lighting fixtures are provided. The apparatus comprises a start controller for providing power to the plurality of lighting fixtures. A control power timer is connected to the start controller for providing a first time period for illumination of the plurality of lighting fixtures, wherein the start controller is operable to interrupt power to the plurality of lighting fixtures when the first time period expires. A control timer is connected to the control power timer for providing a second time period for illumination of the plurality of lighting fixtures, wherein the second time period commences and then elapses before the end of the first time period. A control flasher is connected to the control timer for alternating the plurality of lighting fixtures between a high power state and a low power state during the second time period for illumination. An end user is alerted to the termination of the illumination of the plurality of lighting fixtures before termination occurs.

BRIEF DESCRIPTION OF THE DRAWINGS

The details of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although the present invention is described for use in recreational facilities, the present invention can be used in other types of facilities and still fall within the scope of this invention. It will be appreciated by those skilled in the art that the term recreational facilities includes, but is not limited to, tennis courts, batting ranges, golf driving ranges, and the like. In addition, the present invention can be practiced at indoor and/or outdoor facilities.

Figure 1:
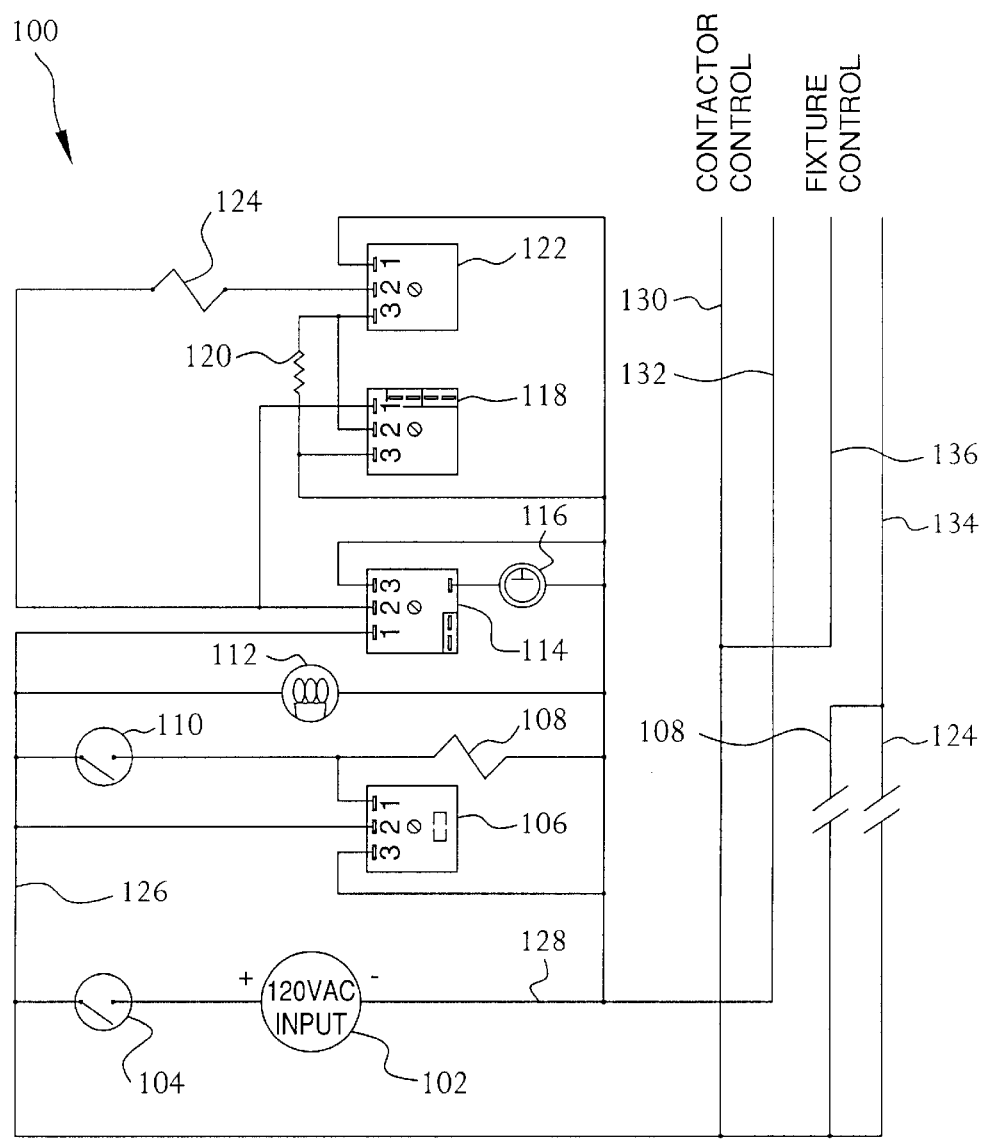
FIG. 1 is a schematic diagram of a switched level activity monitor (SLAM) constructed in accordance with an embodiment of the present invention.

FIG. 1 depicts a circuit schematic diagram of a switched level activity monitor (SLAM) circuit in accordance with a first embodiment of the present invention. The SLAM 100 comprises a power source 102, a power switch 104, a start controller 106, a first relay 108 operable in conjunction with the start controller 106, a keylock power switch 110, a light emitting diode (LED) 112, a control power timer 114, an override switch 116 operable in conjunction with the control power timer 114, a control timer 118, a resistor 120, a control flasher 122, a second relay 124 operable in conjunction with the control flasher 122, a hot line 126, a neutral line 128, a contactor control hot line 130, a contactor control neutral line 132, a fixture control hot line 134 and a fixture control neutral line 136.

The operation of the SLAM 100 will now be described. The power source 102 is connected to the neutral line 128 and to the hot line 26 via the power switch 104. Thus, when power is supplied to the circuit via power source 102, the SLAM 100 receives power when the power switch 104 is closed.

In one embodiment, the SLAM 100 can interface with a commercial or industrial power system (e.g., 480 VAC) voltage line and control a plurality of lights (not shown). SLAM 100 can be used in a high intensity discharge (HID) dimming system. However, those skilled in the art will appreciate that the present invention may be used in other types of lighting systems.

In still another embodiment of the invention, SLAM 100 can interface with a low voltage line and control a plurality of lights. SLAM 100 controls the plurality of lights directly in both the high voltage and low voltage applications. No intermediate device is required.

In addition to being the main power switch for SLAM 100, the power switch 104 is also the main power switch for the lighting fixtures (not shown) being controlled by the SLAM 100. By closing power switch 104, power is supplied to contactor control hot line 130 and contactor control neutral line 132 which are respectively connected to hot line 126 and neutral line 128. The two contactor control lines 130, 132, in turn, are connected to a control coil (not shown) of lighting contactors that are attached to the lights being powered. Specifically, closing power switch 104 causes power to be supplied to the lights.

Start controller 106 is connected to neutral line 128 via pin 3, to hot line 126 via pin 3, and to keylock power switch 110 and first relay 108 via pin 1. When power switch 104 is closed, the start controller causes the first relay 108 to close which, in turn, causes power to be delivered to the fixture control hot line 134 and fixture control neutral line 136. The two fixture control lines 134, 136 are connected to a bi-level relay (not shown) which is in each one of the plurality of lights. Accordingly, the SLAM 100 controls the bi-level relays in the plurality of lights.

The start controller 106 is preferably a 15 minute "start-at-high" controller. Light manufacturers require an initial 15 minute interval before full power is applied to the plurality of lights for warranty reasons. Start controller 106 is only reset if there is an interruption in power to the SLAM 100. For example, if there is an electrical outage, start controller 106 will be reset, and the plurality of lights will be allowed to warm up for 15 minutes when power is restored. After the initial, timed warm-up period, the lights can return to the low power state, and the main control function is enabled.

The keylock power switch 110 serves as a manual override. Closing the contacts of keylock power switch 110 closes first relay 108. Thus, there is no ability to use the timing features of the SLAM 100 since power is applied directly to first relay 108 and not via the start controller 106. Therefore, the plurality of lights remain at full power until keylock power switch 110 is turned off. Keylock power switch 110 can be useful for maintenance purposes, special events or for the initial burn-in of new lights, among other uses.

In the present embodiment of the invention, first relay 108 and second relay 124 are in parallel. Either relay being powered can cause the fixture control lines 134, 136 to go high. The two relays operate as a logical "or" gate. Therefore, the closing of either or both of the relays results in the fixture control lines 134, 136 going high.

The closing of either power switch 104 and/or keylock power switch 110 applies power to LED 112, which is bridged across hot line 126 and neutral line 128 and provides a visual indication that the SLAM 100 is receiving power.

The control power timer 114 is connected to the hot line 126 via pin 1, and pin 3 is connected to the neutral line 128. Pin 4 is connected to over-ride switch 116 which is, in turn, connected to neutral line 128. Pin 2 is connected to pin 1 of control timer 118. Pin 2 of control power timer 114 is also connected to second relay 124 which is, in turn, connected to pin 1 of control flasher 122. Pin 3 of control timer 118 is connected to the neutral line 128 and to resistor 120 which is also connected to pin 2 of control timer 118 and to pin 3 of control flasher 122. Pin 2 of control flasher 122 is connected to the neutral line 128.

Resistor 120 can be a power resistor. The resistor 120 drains excess charge which may build up when solid state devices such as control timer 118 and control flasher 122 are connected together. Specifically, resistor 120 maintains the proper operation of the two devices and prevents faults such as residual charge build up from occurring and turning on the two devices improperly.

When power is applied to SLAM 100 and power switch 104 is closed, power is supplied to the contactor control lines 130, 132. After a 15 minute warm up period, start controller 106 closes first relay 108. The control power timer 114 operates the main timing for the SLAM 100. Its timing is adjustable to provide the desired duration of a lighting cycle. Timing adjustment can be implemented via manual initiation by a user using, for example, a push button switch (not shown) connected to the timer 114 or the override switch 116. Accordingly, the plurality of lights are operated for a variable amount of time based on the setting of the control timer 114. The time setting or "lighting cycle" may vary from 15 minutes to 100 minutes. More specifically, the plurality of lights can operate at full power or "high" during the lighting cycle and then go to a no power or low light setting condition when the lighting cycle has elapsed. However, those skilled in the art will appreciate that a timer having a length of time different from the above mentioned timer may be substituted and still fall within the scope of the present invention.

The power timer 114 also serves to operate control timer 118 directly and control flasher 122 indirectly. Prior to the lighting cycle expiring, the power timer 114 commences a delay period corresponding to a period of time before the expiration of the lighting cycle during which the lights are flashed to indicate to a user that the lighting cycle is about to expire. Power timer 114 activates control timer 118 at the beginning of the delay period via pin 1 of control timer 118. Control timer 118 is a delay-on-make-interval type relay and delays closing its relay for some pre-set time, then closes for a pre-set interval, then reopens again. The control timer 118 activates the control flasher 122 for the delay period whereby the control flasher 122 applies power to second relay 124 closing the second relay 124 which, as previously discussed above, brings the plurality of lights to full power. During normal operation, the plurality of lights operate at full power during the lighting cycle. However, in accordance with an aspect of the present invention, one of the pins of the control flasher 122 is switched to neutral via control timer 118. Control flasher 122 being a dual mode relay, acts a flasher oscillating its output from high to low. Second relay 124, in turn, oscillates from high to low via pin 1 of control flasher 122. The plurality of lights, in response to second relay 122 oscillating from high to low, also oscillate from high to low during the delay period. The oscillation from high to low during the delay period alerts the user of the recreational facility that the period for illumination of the recreational facility is about to expire. The user, therefore, has until the delay period expires to reset the power timer 114 via the push button switch.

In a first embodiment of the present invention, an end user may press over ride switch 116 during the delay period which will cause power timer 114 to begin a new period of illumination once the delay period ends, that is, the original period of illumination will expire based on power timer 114 finishing its time period. A new period of illumination cannot begin until the original period of illumination comes to an end based on power timer 114 finishing its timing cycle to completion.

In another embodiment of the present invention, an end user presses override switch 116 during the delay period, which causes power timer 114 to begin a new period of illumination instantly before the delay period expires. Specifically, the power timer 114 resets its timer during the delay period initiating a new period of illumination.

It will be appreciated by those skilled in the art that according to the teachings of the present invention, the end user has control over the period of illumination. The end user may use the facility for the initial period of illumination or may seek to extend the period of illumination. The end user is alerted to the need to extend the period of illumination via the flashing of lights as opposed to being in a facility and finding oneself to be in the dark once the period of illumination has expired.

The SLAM 100 circuit preferably includes the components listed in the following table:

| DEVICE | COMPONENT |
|---|---|
| 104 | Power Switch |
| 106 | 15 Minute Solid State Timer |
| 108 | 120 Volt Relay |
| 110 | Key Switch |
| 112 | 125 Volt Light Emitting Diode |
| 114 | Adjustable Delay-On-Make Timer |
| 116 | Push Button Switch |
| 118 | Adjustable Delay-On-Make Timer |
| 120 | 10K Ohm 20 Watt Resistor |
| 122 | Adjustable Dual Mode Timer/Flasher |
| 124 | 120 Volt Relay |

Figure 2:
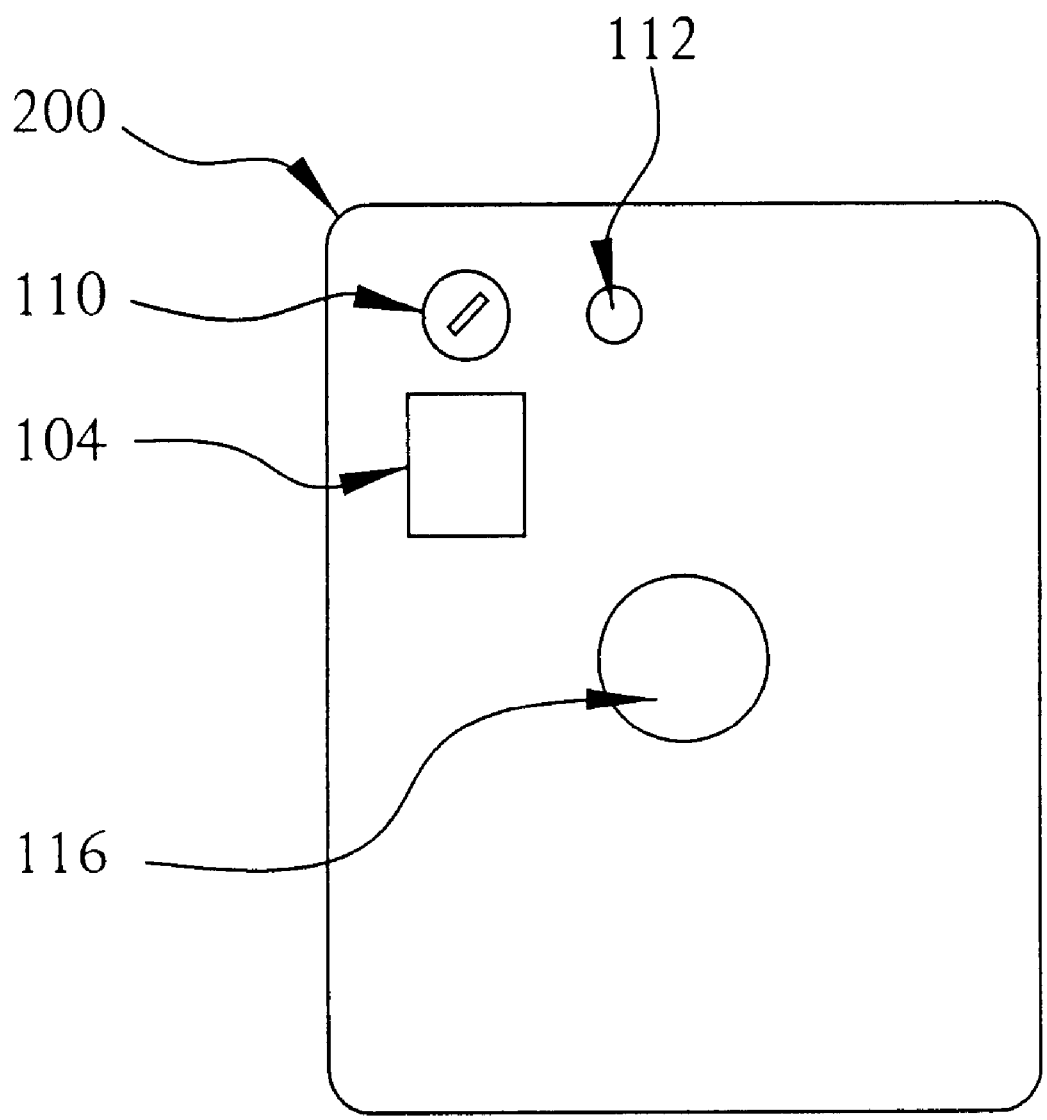
FIG. 2 is a front view of an exemplary face panel box for the SLAM depicted in FIG. 1.

Turning now to FIG. 2, an exemplary layout for a face panel box 200 for the SLAM 100 is depicted. The buttons, switches and LED are structured and arranged to allow an end user and/or facility owner or maintenance person easy access to the switches, buttons and LED. It will be appreciated by those skilled in the art that the buttons, switch and LED can be arranged in a different arrangement and still fall within the scope of the invention. For instance, power switch 104 is displayed on the face of the box 200. However, the invention may be practiced where access to power switch 104 may require opening the box 200 with a key. This may prevent end users who do not have legal access to the facility from turning on the lights of the facility without having a key to box 200.

Figure 3:
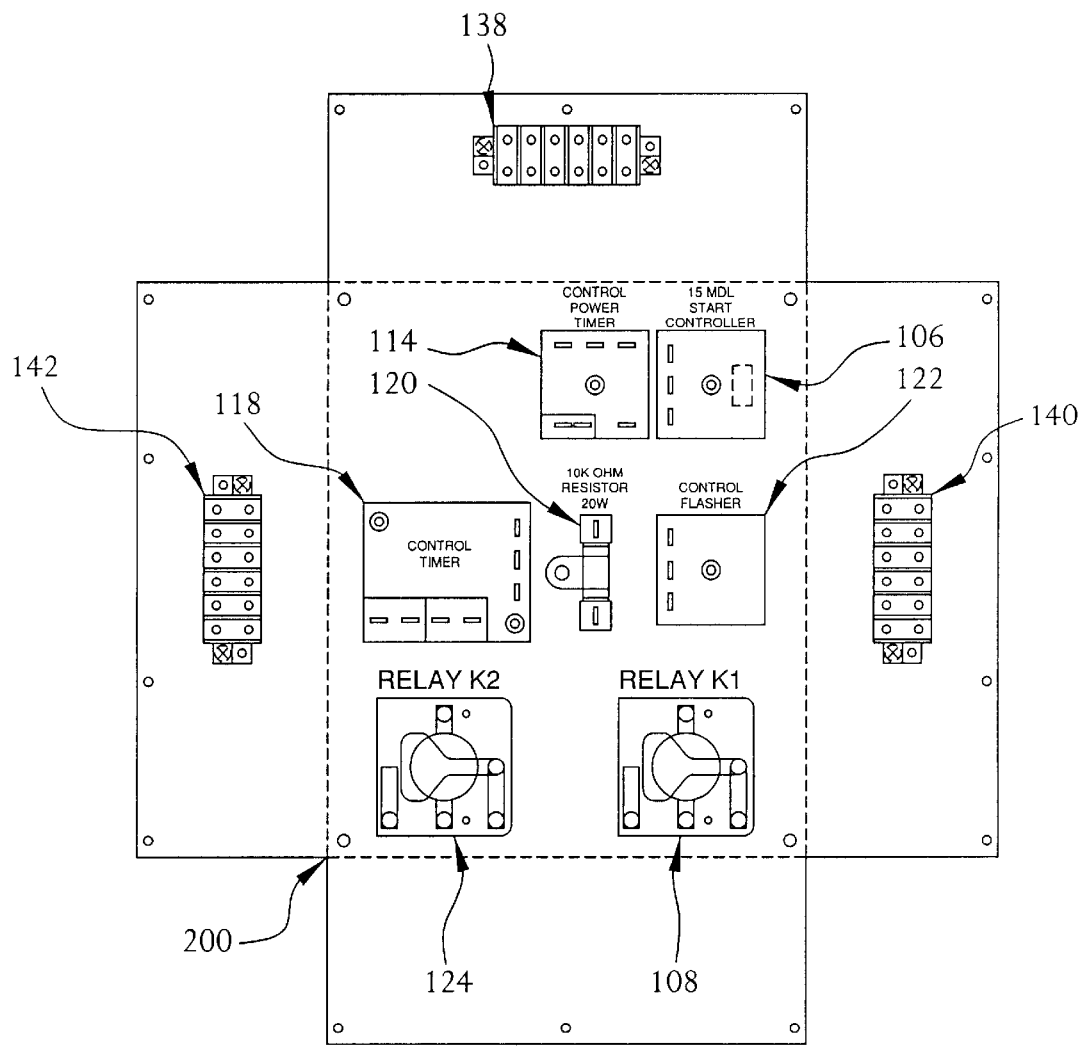
FIG. 3 depicts an exemplary configuration for circuit components of the SLAM within the panel box.
Figure 4:
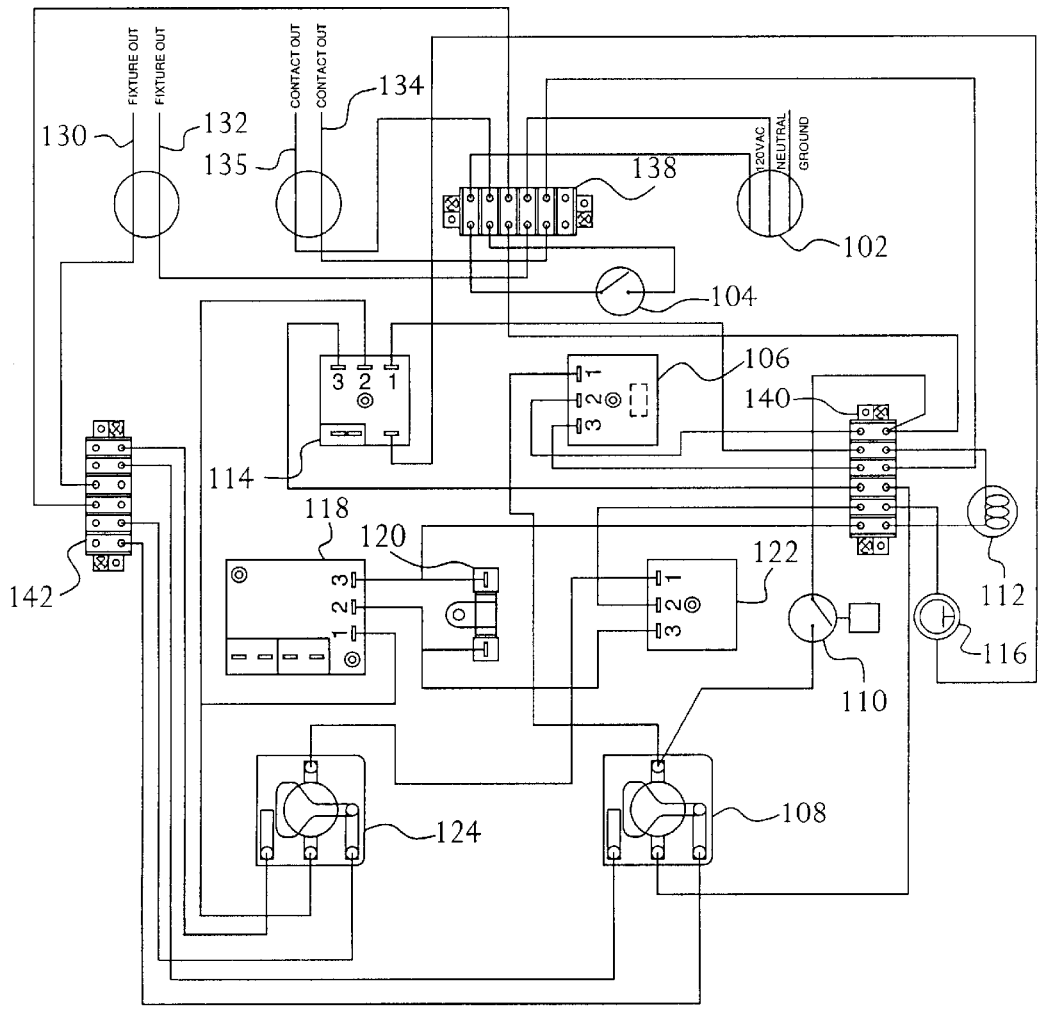
FIG. 4 is a schematic diagram of the SLAM of FIG. 1 and its components in FIG. 3.

FIG. 3 depicts a diagram showing an exemplary layout for the SLAM 100 within the panel box 200. FIG. 3 includes all of the components of FIG. 1 in addition to power terminal block 138, power bus block 140 and contact terminal block 142. The main power source is connected to power terminal block 138. In turn power terminal block 138 is connected to contact terminal block 142, power bus block 140, contactor control neutral line 132, contactor control hot line 130 and fixture control hot line 134 (see FIG. 4). The components for the SLAM 100 circuit are supplied power via the power bus terminal 140 and contact terminal block 142.

Figure 5:
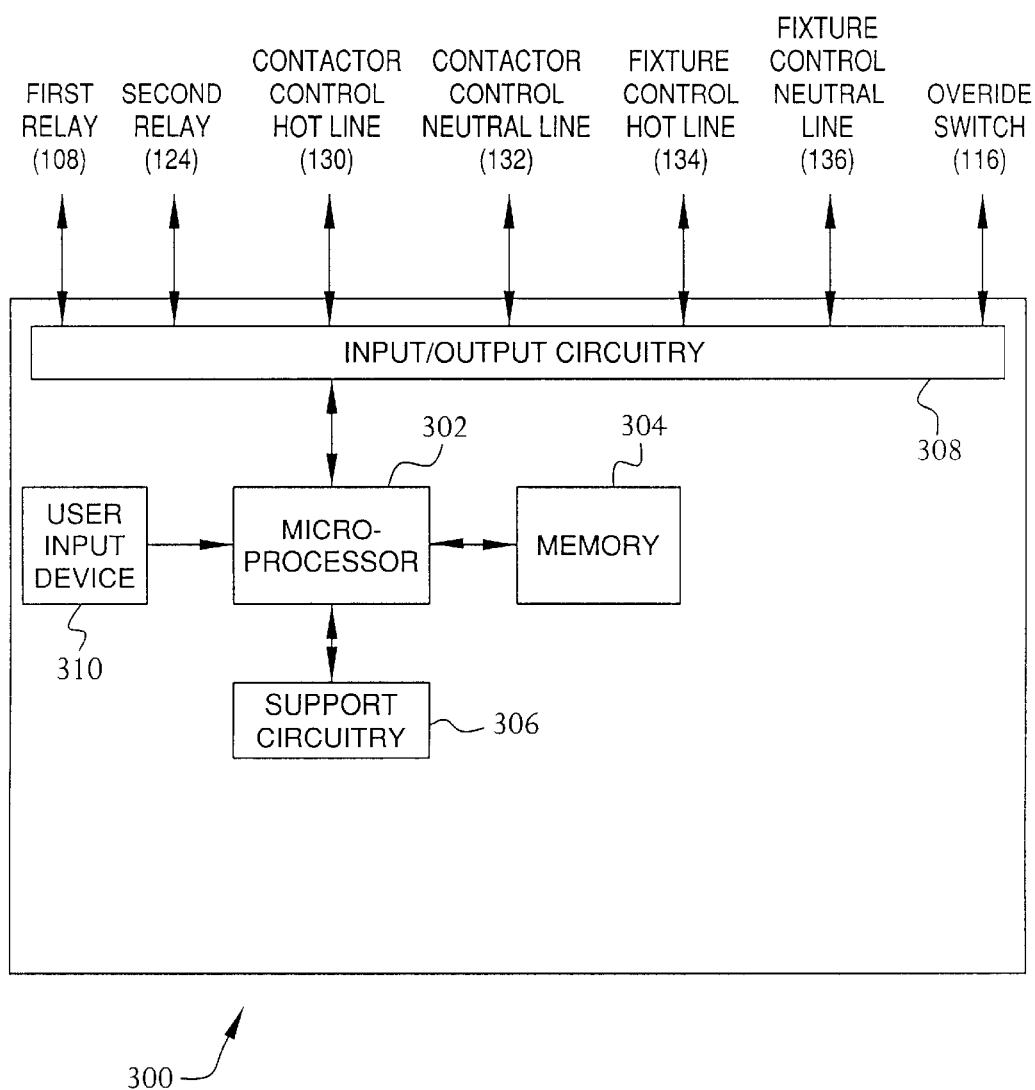
FIG. 5 is a schematic diagram of a SLAM constructed in accordance with another embodiment of the present invention.

Turning to FIG. 5, an alternative embodiment for SLAM 100 is depicted. Specifically, FIG. 5 depicts a programmable processor 300 suitable for use in the SLAM 100 circuit. The programmable processor 300 comprises a microprocessor 302, as well as memory 304 for storing programs for various timing functions. The microprocessor 302 cooperates with conventional support circuitry 306 such as power supplies, clock circuits and the like, as well as circuits that assist in executing the timer functions of the present invention. A user interface device 310 such as a keypad is provided to enter selected time out periods.

The programmable processor 300 also comprises input/output circuitry 308 that forms an interface between the microprocessor 302, first relay 108, second relay 124, contactor control hot line 130, contactor control neutral line 132, fixture control hotline 134, fixture control neutral line 136 and override switch 116. The input/output circuitry 308 can interface with lines 130, 132, 134 and 136 extending to different groups of light fixtures such that these groups can be programmed to operated independently of each other and in accordance with different lighting cycles and delay periods that are programmed from a single, convenient control point (e.g., via the user interface 310).

Although the programmable processor 300 is depicted as a general purpose computer that is programmed to perform the timer functions of start controller 106, control power timer 114, control timer 118 and control flasher 122 in accordance with the present invention, the invention can be implemented in hardware, in software, or a combination of hardware and software. As such, the timer functions described above with respect to the various figures are intended to be broadly interpreted as being equivalently performed by software, hardware, or a combination thereof.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and the following claims.

What is claimed is:

1. An apparatus for controlling a plurality of lighting fixtures comprising:
   a start controller for providing power to said plurality of lighting fixtures;
   a control power timer connected to said start controller for providing a first time period for illumination of said plurality of lighting fixtures, said start controller being operable to interrupt power to said plurality of lighting fixtures when said first time period expires;
   a control timer connected to said control power timer for providing a second time period for illumination of said plurality of lighting fixtures, said second time period commencing and then elapsing before the end of said first time period; and
   a control flasher connected to said control timer for alternating said plurality of lighting fixtures between a high power state and a low power state during said second time period for illumination, wherein an end user is alerted to the termination of the illumination of said plurality of lighting fixtures prior to said termination.

2. The apparatus of claim 1, further comprising:
   a first relay connected to said first plurality of lighting fixtures, a power source, and said start controller and operable to open in response to said start controller to power said plurality of lights.

3. The apparatus of claim 2, further comprising:

a second relay connected to said plurality of lights, said power source, and said control flasher and operable to selectively open and close in response to said control flasher alternating between an off and on state.

4. The apparatus of claim 3, wherein the opening and closing of said second relay results in said plurality of lighting fixtures alternating between said high power state and said low power state.

5. The apparatus of claim 1, wherein said second period of illumination comprises a delay period.

6. The apparatus of claim 1, further comprising:

a power on indication device connected to said start controller to indicate when power is provided to said plurality of light fixtures.

7. The apparatus of claim 6, wherein said power on indication device comprises a light emitting diode.

8. The apparatus of claim 1, wherein said apparatus interfaces a high power system for controlling said plurality of light fixtures.

9. The apparatus of claim 1, wherein said power system provides 480 VAC.

10. The apparatus of claim 1, wherein said start controller is operable to power said plurality of lighting fixtures in a high power state without dimming for a selected period of time.

11. The apparatus of claim 10, wherein said selected period of time is one of 15 minutes and a light warm-up time period selected by the manufacturer of said plurality of lighting fixtures.

12. The apparatus of claim 1, further comprising:

a keylock power switch for providing a manual override function for said apparatus.

13. The apparatus of claim 3, wherein said first relay and said second relay are connected in parallel.

14. The apparatus of claim 1, further comprising:

an override switch connected to the control power timer for resetting the control power timer when said override switch is activated.

15. The apparatus of claim 14, wherein the override switch resets the control power timer at the end of the second time period.

16. The apparatus of claim 1, further comprising:

a power switch connected to said start controller for controlling power to said apparatus.

17. A method for controlling a plurality of lighting fixtures comprising:

illuminating said plurality of lighting fixtures via a control circuit for a first time period; and alternating said plurality of lighting fixtures between a high power state and a low power state during a second time period that commences and then elapses before the end of said first time period to alert an end user of the termination of said illumination.

18. The method of claim 17, further comprising:

resetting said control circuit in response to a determination that additional time is required for illumination to continue the illumination of said plurality of lighting fixtures after said second time period.

19. The method of claim 18, wherein a first new time period corresponding to said first time period for illumination begins at the end of said second time period, and a second new time period corresponding to said second time period commences and then elapses before the end of said first new time period to alert an end user of the termination of said illumination.

20. The method of claim 18, wherein said step of resetting comprises:

continuing the illumination of said plurality of lighting fixtures during said second time period.

21. The method of claim 20, wherein a new time period corresponding to said first time period for illumination begins during said second time period.

22. The method of claim 17, wherein said second time period comprises a delay period.

23. The method of claim 17, wherein said first time period comprises a lighting cycle for continuous illumination.

24. The method of claim 17, further comprising:

operating said circuit in a high power system.

25. The method of claim 24, wherein said high power system provides 480 VAC.

26. The method of claim 17, wherein said circuit controls said plurality of lighting fixtures via two wires.

27. A programmable control device for controlling a plurality of lighting fixtures comprising:

a switching device; and a processing device connected to said switching device and operable in accordance with program code to control said switching device to illuminate said plurality of lighting fixtures for a first time period, and alternate said plurality of lighting fixtures between a high power state and a low power state during a second time period that commences and then elapses before the end of said first time period to alert an end user of the termination of said illumination.

28. The programmable control device of claim 27, wherein said processing device is connected to input/output circuitry for interfacing said processing device with other devices.

29. The programmable control device of claim 28, wherein said other devices comprise at least one of:

a first relay connected to said plurality of lighting fixtures and operable to open in response to a signal from said processing device;

a second relay connected to said plurality of lights and operable to selectively open and close in response to a signal from said processing device; and an override switch for resetting said processing device.

30. The programmable control device of claim 29, wherein the override switch resets said processing device at the end of said second time period.

31. The programmable processing device of claim 27, wherein said switching device is connected to different groups of lighting fixtures, and said processing device is programmable to operate said different groups of lighting fixtures using a different first time period and a different second time period.

* * * * *